United States Patent

Brooks

[15] 3,665,570
[45] May 30, 1972

[54] METHOD FOR MONITORING THE CAPACITANCE OF A CAPACITOR WHILE ADJUSTING ITS CAPACITANCE

[72] Inventor: Robert Lee Brooks, Indianapolis, Ind.
[73] Assignee: RCA Corporation
[22] Filed: Apr. 7, 1970
[21] Appl. No.: 26,375

[52] U.S. Cl. ..............................29/25.42, 29/593, 51/319, 317/2 R, 324/60 C
[51] Int. Cl. .......................................................H01g 13/00
[58] Field of Search ..............29/25.42, 593, 574; 51/8, 319; 324/60 C; 317/2 R

[56] References Cited

UNITED STATES PATENTS

| 2,712,172 | 7/1955 | Bayha | 51/8 X |
| 2,457,669 | 12/1948 | Hart | 317/2 R X |
| 2,390,784 | 12/1945 | Drobish et al. | 29/25.42 |
| 3,394,386 | 7/1968 | Weller et al. | 29/593 X |
| 3,453,781 | 7/1969 | Greenman | 51/8 |
| 3,456,170 | 7/1969 | Hatch | 29/593 X |

Primary Examiner—John F. Campbell
Assistant Examiner—Carl E. Hall
Attorney—Glenn H. Bruestle

[57] ABSTRACT

The capacitance of a planar capacitor, having a common plate separated from two bottom plates by a dielectric material, is monitored with an AC-capacitance bridge while the common plate is trimmed with an abrasive material until the capacitor acquires a desired value of capacitance. An electrostatic charge formed on the common plate by the trimming operation is discharged to ground via a high resistance path so as not to interfere with the monitoring operation. A pair of probes connected to monitoring apparatus and a probe for connecting the high resistance path to the common plate are physically connected to a common support for applying the probes to the capacitor simultaneously.

5 Claims, 3 Drawing Figures

PATENTED MAY 30 1972 3,665,570
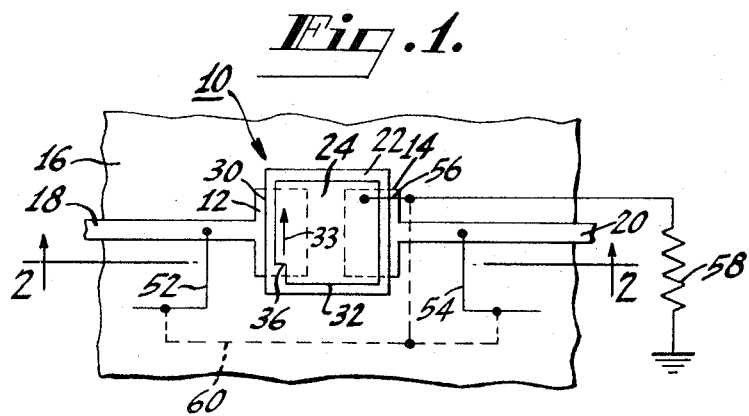
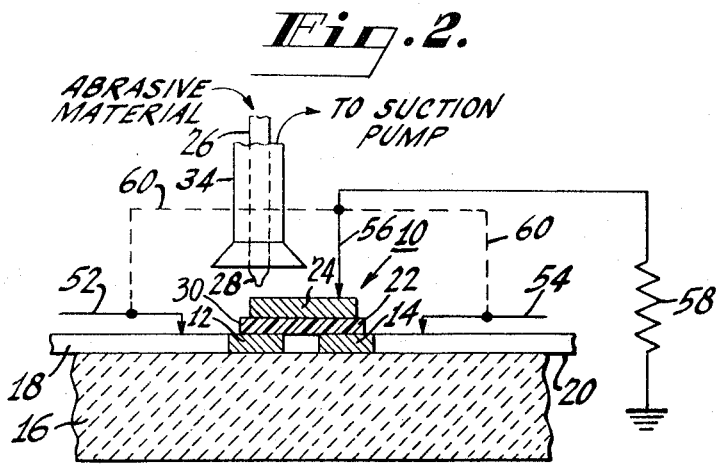
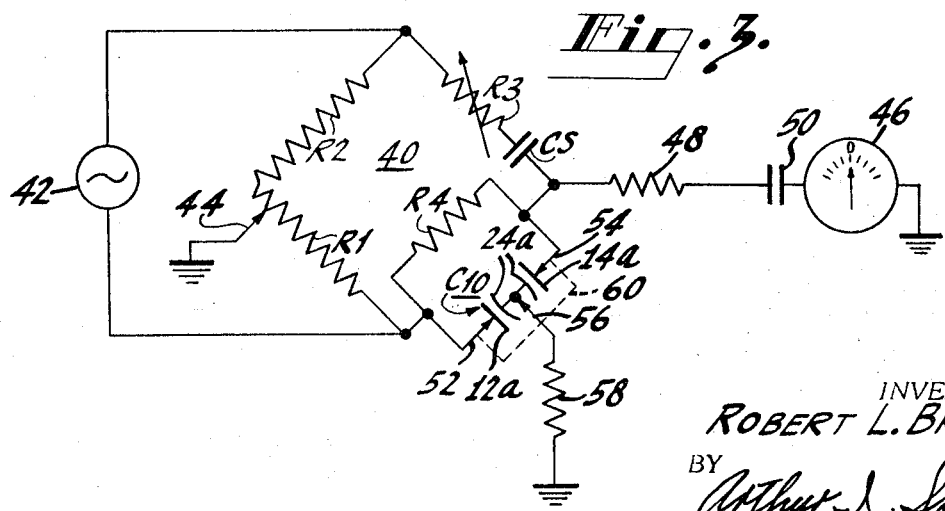
INVENTOR.
ROBERT L. BROOKS
BY Arthur J. Spechler
Attorney 3,665,570

METHOD FOR MONITORING THE CAPACITANCE OF A CAPACITOR WHILE ADJUSTING ITS CAPACITANCE

BACKGROUND OF THE INVENTION

This invention relates generally to a method of and apparatus for trimming a plate of a capacitor, and more particularly, to a novel method of and novel apparatus for trimming the plate of a capacitor with an abrasive material while monitoring the capacitance of the capacitor during the trimming operation. The novel method and apparatus are particularly useful for adjusting the capacitance of a planar capacitor that has been applied to a ceramic substrate by a thick-film process.

It has been proposed to abrade a plate of a capacitor with an abrasive material, such as from sandblasting apparatus, while monitoring the capacitance of the capacitor. However, I have discovered that an electrostatic charge is often formed on the abraded plate during the trimming operation that interferes with the monitoring operation, causing the monitoring apparatus to indicate inaccurate values of capacitance.

The novel method and apparatus are improvements over prior-art method and apparatus in that they provide means for effectively removing the unwanted electrostatic charge, thereby permitting the monitoring apparatus to monitor the capacitance of the capacitor accurately.

SUMMARY OF THE INVENTION

The novel method of trimming a plate of a capacitor while monitoring its capacitance is carried out with the aid of novel apparatus whereby an electrostatic charge developed on the trimmed plate is discharged via a high resistance path.

The novel apparatus comprises a high resistance path adapted to be connected to the trimmed plate by a probe. The monitoring apparatus is adapted to be connected to the capacitor by a pair of probes, and the three aforementioned probes are fixed to a common support for application to the capacitor simultaneously.

By the term "ground", as used herein, is meant a point of reference potential, such as a common connection usually designated by the schematic symbol for ground.

BRIEF DESCRIPTION OF THE DRAWINGS

FIG. 1 is a fragmentary plan view of a thick-film planar capacitor on an insulating substrate, schematically showing a high resistance path between the capacitor and ground;

FIG. 2 is a fragmentary cross-sectional view of the capacitor and substrate illustrated in FIG. 1, taken along the line 2—2, and showing, in addition abrasive trimming means for trimming the common plate of the planar capacitor and probes fixed to the capacitor for monitoring purposes; and FIG. 3 is a schematic drawing of an AC-capacitance bridge circuit for measuring the capacitance of the planar capacitor, showing the high resistance path connected to the common plate of the planar capacitor.

BRIEF DESCRIPTION OF THE PREFERRED EMBODIMENTS

Referring now particularly to FIGS. 1 and 2 of the drawing, there is shown a planar capacitor 10 to which the novel method and apparatus may be applied. The capacitor 10 comprises a pair of spaced-apart bottom electrodes or plates 12 and 14 disposed on an insulating substrate 16. The substrate 16 may comprise a ceramic material of aluminum oxide, for example, and the bottom plates 12 and 14 may be applied to the substrate 16 by silk screeing techniques with conductive metallizer ink, in a manner well known in the art of thick-film technology. A silver-palladium composition, Number 8151, supplied by E. I. du Pont de Nemours Co., Inc. may be used as the metallizer ink. Conductors 18 and 20, also supported on the substrate 16, are integral with the bottom plates 12 and 14, respectively, and may also be applied to the substrate 16 by silk screening techniques with metallizer ink.

A suitable dielectric material 22, such as a thick-film dielectric composition Ex 8289R, supplied by E. I. duPont de Nemours Co., Inc. is silk screened over the bottom plates 12 and 14, and a top common electrode or plate 24 of conductive metallizer ink, is silk screened over the dielectric material 22. Planar capacitors of the type described may have a capacitance in the range between 1 picafarad and 200 picafarads.

When the capacitors of the type described are deposited on the substrate 16 by thick-film techniques, as described, their capacitances are usually not uniform or of a desired exact value. The capacitance of each capacitor so formed may be larger than necessary so that a portion of a plate of the capacitor may have to be removed to give the capacitor the desired value of capacitance. To this end, means are provided to trim a portion of the common plate 24 of the capacitor 10 until the capacitor 10 acquires the desired value.

Referring now to FIG. 2, there are shown means to trim the common plate 24 with an abrasive material, such as sand, boron carbide, or aluminum oxide, for example. A nozzle 26 formed with a very small opening 28 is disposed over, and slightly spaced from, an edge 30 of the common plate 24. The nozzle 26 is a part of abrasive trimming apparatus (not shown) of a type well known in the art, such as, for example, Abrasive Resistance Trimming System, model AT–701, manufactured by S. S. White Company, New York, N.Y. The nozzle 26 is connected to means (not shown) to move it automatically, over the common plate 24 in the direction of the arrow 33, in a manner well known in the art. Thus, abrasive material, in the form of a powder, is forced through the nozzle 26 and onto the common plate 24 to abrade a portion thereof as the nozzle is moved over the common plate 24. A funnel 34 surrounds the nozzle 26 and is connected to a suction pump for removing the abrasive material from the capacitor 10 after it has abraded the common plate 24. Referring now to FIG. 1, the top plate 24, which was originally disposed in the form of a rectangular plate, is shown with a notch 36 therein, adjacent to edges 30 and 32, formed by the removal of material during the trimming operation.

Referring now to FIG. 3, there is shown a circuit 40 of an AC-capacitance bridge for monitoring the capacitance of the capacitor 10 during the trimming operation and to indicate when the capacitor 10 has been trimmed to a preset desired capacitance. The AC-capacitance bridge operates on the principle of the Wheatstone bridge in which an unknown impedance is balanced against known impedances.

A source 42 of AC voltage, having a frequency ($f$) of about 1,000 Hz, is applied across serially connected resistors R1 and R2 and across a series circuit comprising a variable resistor R3, a standard capacitor CS, and a resistor R4 in parallel with a capacitor C10 to be monitored.

The capacitor 10 in FIGS. 1 and 2 is represented as C10 in the circuit 40 in FIG. 3, and the symbols of the parts of the capacitor 10 that are represented in the circuit 40 are given the same reference numeral as previously with the addition of the suffix letter a. A grounded tap 44 is movable between the resistors R1 and R2 to change the ratio of resistance therebetween, and an indicator, such as a meter 46, is connected between a common connection, ground, and the standard capacitor CS through a resistor 48 and a DC-blocking capacitor 50. The capacitor C10 to be monitored is disposed between a pair of probes 52 and 54 adapted to electrically contact the bottom plates 12a and 14a through the leads 18a and 20a, respectively.

While an AC-capacitance bridge of the type described by the circuit 40 is adequate for measuring the capacitance of an unknown capacitor in a manner known in the art, it is not suitable and/or reliable, without the improvement of the present invention, for monitoring the capacitance of the capacitor 10 accurately while one of its plates (common plate 24) is being abraded. It has been discovered that a relatively large electrostatic charge is formed on the common plate 24 during the trimming operation, produced by the abrading of the common plate 24, and this electrostatic charge materially interferes with the efficient operation of the AC-capacitance bridge. In fact, the electrostatic charge produced by the trimming operation is sometimes great enough to produce visible sparking on the common plate 24.

In accordance with the novel method and apparatus, means are provided to discharge the electrostatic charge on the common plate 24 of the capacitor 10 so that its capacitance can be measured accurately and without interference from the unwanted electrostatic charge. To this end, a high resistance path between the common plate 24 and a common connection, such as ground, is provided. The high resistance path comprises a probe 56 having one end adapted to contact the surface of the common plate 24 and the other end connected to the common connection, ground, through a resistor 58. It has been found that for capacitors of the type described herein (1 – 200 picafarads), the resistor 58 should have a value of between 20 and 60 megohms to effectively discharge the electrostatic charge formed on the common plate 24 during the trimming operation. A higher value of resistance does not discharge the unwanted electrostatic charge fast enough, and a smaller value of resistance interferes with the capacitance-monitoring operation.

In order to facilitate the capacitance-monitoring operation during the trimming operation, the probes 52, 54, and 56 are brought into electrical contact with the plates 12, 14, and 24 of the capacitor 10 substantially simultaneously. This is accomplished by mechanically connecting the probes 52, 54, and 56 to a common support, indicated in the drawing by a dashed line 60, from which they are suitably insulated. The common support 60 may be any suitable member to which the probes 52, 54, and 56 are attached, and insulated therefrom, in a manner whereby all three probes are spaced so that they may be applied simultaneously to the capacitor 10 by a common movement.

In operation, the movable tap 44 and the variable resistor R3 are adjusted so that the AC-capacitance bridge of circuit 40 is balanced when the capacitor C10 is of a desired capacitance, say, for example, 100 picafarads. If, in testing a capacitor, such as the capacitor 10, its capacitance is too high, abrasive material is pumped through the nozzle 26, and the nozzle 26 is moved in the direction of the arrow 32 to remove a portion of the common plate 24 until the AC-capacitance bridge is balanced, that is, until the meter 46 reads zero. Any electrostatic charge that is formed on the common plate 24 during the trimming operation is discharged through the high resistance path including the resistor 58. Hence the AC-capacitance bridge can be balanced accurately to indicate a preset capacitance of the capacitor while it is being trimmed, without interference from unwanted electrostatic charges that may be formed during the trimming operation.

While the novel method and of a have been described herein in conjunction with a planar capacitor, they may also be employed to measure the capacitance or a conventional capacitor of the type wherein two plates are separated by a dielectric material. In the latter case, the plate that is being trimmed is connected to the high resistance path to neutralize any electrostatic charge that may form on it during the capacitance monitoring operation.

What is claimed is:

1. In a method of trimming a plate of a capacitor while electrically monitoring the capacitance of said capacitor, wherein an electrostatic charge is formed on said plate during the trimming operation, the improvement comprising:
   discharging said electrostatic charge through a high resistance path of greater than 20 megaohms during said trimming operation.

2. In a method as described in claim 1, wherein
   said trimming operation comprises directing an abrasive material onto said plate to remove a portion thereof, and
   said discharging said electrostatic charge comprises connecting a resistor of between 20 and 60 megohms between said plate and a point of reference potential.

3. In a method as described in claim 1, wherein
   said capacitor is a planar capacitor having a capacitance in the range between 1 and 200 picafarads, said plate comprises the common plate of said planar capacitor,
   said discharging said electrostatic charge comprises connecting a resistor of between 20 and 60 megohms between said common plate and ground, and
   said monitoring the capacitance of said capacitor comprises connecting two probes to the remaining two plates, respectively, of said capacitor.

4. In a method of trimming the common plate of a planar capacitor, comprising said common plate and two bottom plates, while electrically monitoring the capacitance of said planar capacitor, wherein an abrasive material is directed onto a portion of said common plate to remove a portion thereof, and an electrostatic charge is produced on said common plate during the trimming operation, the improvement comprising:
   connecting capacitance measuring apparatus between said bottom plates of said planar capacitor, and
   providing a high resistance path of greater than 20 megaohms between said common plate and ground, whereby to discharge said electrostatic charge on said common plate.

5. In a method as described in claim 4, wherein said planar capacitor has a capacitance in the range between 1 and 200 picafarads, and
   said providing a high resistance path comprises providing a circuit between said common plate and ground, said circuit comprising a resistor whose resistance is in the rang between 20 and 60 megohms.

* * * * *